(12) United States Patent
Stephens

(10) Patent No.: US 6,236,487 B1
(45) Date of Patent: May 22, 2001

(54) OPTICAL COMMUNICATION CONTROL SYSTEM

(75) Inventor: Thomas D. Stephens, Ellicott City, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/119,561

(22) Filed: Jul. 21, 1998

(51) Int. Cl.$^7$ .................................................. H04B 10/00

(52) U.S. Cl. .................. 359/161; 359/124; 359/177; 359/187

(58) Field of Search ................... 359/124, 161, 359/187, 177

(56) References Cited

U.S. PATENT DOCUMENTS

| | | |
|---|---|---|
| 4,616,898 | 10/1986 | Hicks, Jr. . |
| 5,007,705 | 4/1991 | Morey et al. . |

(List continued on next page.)

FOREIGN PATENT DOCUMENTS

| | | |
|---|---|---|
| 0853396 A2 | 7/1998 | (EP) . |
| WO 99/43107 | 8/1999 | (WO) . |

OTHER PUBLICATIONS

Park, S.Y., et al., Feasibility Demonstration Of 10 Gbit/s Channel WDM Network Using Dynamic Gain–Controlled EDFAs, Electronics Letters, Mar. 5$^{th}$ 1998, vol. 34, No. 5., Online No. 19980346.

Dung, J.C., et al., Gain Flattening Of Erbium Doped Fibre Amplifier Using Fibre Bragg Gratings, Electronics Letters, Mar. 19$^{th}$ 1998, vol. 34, No. 6., Online No. 19980446.

Yu, A., et al., Analysis Of Optical Gain And Noise Spectral Properties Of Erbium–Doped Fiber Amplifer Cascade, Optical Amplifiers and their Application, Aug. 3–5, 1994, 1994 OSA Technical Digest Series, V14, pp. FB1–1–3/124–126.

Sugaya, Y., et al., Novel Configuration For Low–Noise And Wide–Dynamic–Range Er–Doped Fiber Amplifiers For WDM Systems, Optical Amplifiers and their Application, Jun. 15–17, 1995, 1995 OSA Technical Digest Series, V18, FC3–1–4/158–161.

Jacobovitz–Veselka, G.R., et al., Single–Stage Booster Amplifier With Two 980 nm Pumps Stabilized By Fiber Gratings, Optical Amplifiers and their Application, Jun. 15–17, 1995, 1995 OSA Technical Digest Series, V18, pp. FC4–1–4/162–165.

*Primary Examiner*—Leslie Pascal
*Assistant Examiner*—Hanh Phan

(57) ABSTRACT

Apparatuses and methods are disclosed for operation of optical transmission systems. An optical transmission system of the present invention includes at least one signal varying device positioned to vary an optical signal passing to an optical processing node to achieve one or more desired signal characteristic in the optical signal as it approaches or reach the optical processing node. A controller is provided and configured to control the at least one signal varying device in response to at least one detected characteristic of said optical signal as it passes to the optical processing nodes. The signal varying devices are controlled collectively, in groups, or individually to achieve the desired characteristics in the optical signal when the optical signal arrives at the optical processing nodes. The processing nodes include optical transmitter in optical communication with optical receivers via signal varying devices, which include amplifiers, attenuators, filters, and other signal varying devices. The signal varying devices are controlled to produce at desired signal characteristic, such as minimized gain flatness variations, or uniform signal to noise ratio versus wavelength profiles at the receiver or an intermediate processing node, such as an add/drop port, control point, or a switch.

28 Claims, 5 Drawing Sheets

U.S. PATENT DOCUMENTS

| | | |
|---|---|---|
| 5,050,949 | 9/1991 | DiGiovanni et al. . |
| 5,058,974 * | 10/1991 | Mollenauer ............................ 385/27 |
| 5,191,586 | 3/1993 | Huber . |
| 5,283,686 | 2/1994 | Huber . |
| 5,406,411 | 4/1995 | Button et al. . |
| 5,500,756 * | 3/1996 | Tsushima et al. ................... 359/174 |
| 5,530,583 | 6/1996 | Uno et al. . |
| 5,541,766 | 7/1996 | Mizrahi et al. . |
| 5,557,442 * | 9/1996 | Huber ................................... 359/179 |
| 5,579,143 | 11/1996 | Huber . |
| 5,636,301 | 6/1997 | O'Sullivan et al. . |
| 5,673,280 * | 9/1997 | Grubb et al. ............................. 372/3 |
| 5,675,432 * | 10/1997 | Kosaka ................................. 359/341 |
| 5,696,615 | 12/1997 | Alexander . |
| 5,717,510 * | 2/1998 | Ishikawa et al. .................... 359/161 |
| 5,764,406 | 6/1998 | Newhouse et al. . |
| 5,812,710 * | 9/1998 | Sugaya ................................... 385/27 |
| 5,815,299 | 9/1998 | Bayart et al. . |
| 5,818,629 * | 10/1998 | Kinoshita ............................. 359/341 |
| 5,861,981 * | 1/1999 | Jabr ...................................... 359/341 |
| 5,880,866 * | 3/1999 | Stolen .................................. 359/138 |
| 5,883,736 * | 3/1999 | Oshima et al. ...................... 359/341 |
| 5,898,714 * | 4/1999 | Morita et al. ............................ 372/6 |
| 5,900,969 * | 5/1999 | Srivastava et al. .................. 359/341 |
| 5,903,371 * | 5/1999 | Arecco et al. ....................... 359/119 |
| 5,963,361 * | 10/1999 | Taylor et al. ........................ 359/337 |
| 5,986,799 * | 11/1999 | Itou et al. ............................ 359/337 |
| 6,038,356 * | 3/2000 | Kerfoot, III et al. .................. 385/24 |

* cited by examiner

OPTICAL COMMUNICATION CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed generally to controlling the transmission of information in communication systems. More particularly, the invention relates to controlling optical signal characteristics during transmission in information network, transmission and communication systems and controllers for use therein.

The continued development of digital technology has provided electronic access to vast amounts of information. The increased access to information has fueled an increasing desire to quickly obtain and process the information. This desire has, in turn, placed ever increasing demands for faster and higher capacity electronic information processing equipment (computers) and transmission networks and systems linking the processing equipment (i.e., telephone lines, cable television (CATV) systems, local, wide and metropolitan area networks (LAN, WAN, and MAN)).

In response to these demands, telecommunications companies have turned to optical communication systems to provide substantially larger information transmission capacities than corresponding electrical systems. Early optical transmission systems, known as space division multiplex (SDM) systems, transmitted one signal in a single wavelength per waveguide, i.e. fiber optic strand. As demand for transmission capacity further increased, multiple optical signals were transmitted in a single wavelength by time division multiplexing (TDM) the various signals in a known sequence onto a signal carrier wavelength.

The continued growth in traditional communications systems and the emergence of the Internet as a means for accessing data has further accelerated the demand for higher speed access to information. Telecommunications companies have looked to wavelength division multiplexing (WDM) to further increase the capacity of their existing optical systems. In WDM transmission systems, pluralities of distinct TDM or SDM information signals are carried using different optical wavelengths. The pluralities of information carrying wavelengths are combined into a multiple wavelength optical signal, which is transmitted in a single optical fiber. In this manner, WDM systems can increase the transmission capacity of existing SDM/TDM systems by a factor equal to the number of wavelengths used in the WDM system.

Optical WDM systems were not initially deployed, in part, because of the cost associated with providing electrical signal regeneration equipment for each wavelength throughout the system. However, the development of the erbium doped fiber optical amplifier (EDFA) eliminated the need for electrical amplifiers and the associated costs in many systems, thereby gaining WDM communication systems acceptance in the marketplace.

EDFAs can theoretically be used to amplify signals in an amplification wavelength range spanning from approximately 1500 nm and 1600 nm. However, as shown in FIG. 1, EDFAs do not equally amplify each wavelength in the range. As a result, the relative performance of EDFAs in a transmission system varies depending upon the wavelengths used in the system.

EDFA variations (gain non-uniformities) can be minimized by the judicious selection of the wavelengths and amplifier powers used in a system. For example, WDM systems currently restrict the wavelengths used in the system to between 1540 nm and 1560 nm, which are comparably amplified by EDFAs. As might be expected, restricting system designs to only those wavelengths that are comparably amplified by EDFAs severely limits the number of wavelengths, i.e., channels, that can be used to carry information.

The number of wavelengths in the system can be increased to some extent, if only a small number of amplifiers are used in the system. Wavelengths having differing EDFA amplification characteristics can be used in those systems, because the cumulative effect of highly amplified noise does not swamp out lowly amplified signals when only a few amplifiers are used.

In addition, the wavelength dependence of EDFAs is also a function of the amplification power (gain) of the EDFA, as further shown in FIG. 1. Thus, the amplification power of each EDFA in the system generally must be restricted to minimize amplification variations in the system. The amplifier power limitations, in turn, limit how far apart the EDFAs can be spaced in a system, i.e., the span length.

The WDM system size constraints imposed by EDFA wavelength variations have focused attention on providing amplifier configurations that compensate for the variations and provide more uniform gain for a larger band of wavelengths. Various EDFA configurations have been proposed in the literature to minimize amplifier gain variations. For example, see U.S. Pat. Nos. 5,406,766, 5,541,766, 5,557,442, 5,636,301, and 5,696,615; Sugaya et al., Optical Amplifiers and Their Applications, Technical Digest OSA 1995 v. 18, pp. 158–161/FC3-1; Jacobovitz-Veselka et al., Optical Amplifiers and Their Applications, Technical Digest OSA 1995 v. 18, pp. 162–165/FC3-1; Masuda et al., OSA 1997, pp. 40–3/MC3-1,; Park et al., Electronics Letters, Mar. 5, 1998, Vol. 34, No. 5, Online No. 19980346; and, Dung et al., Electronics Letters, Mar. 19, 1998, v. 34, n. 6, Online No. 19980446.

The above referenced gain flattened EDFA configurations generally attempt to flatten the amplifier gain profile to within an approximately 1 dB range over a range of wavelengths and/or amplification powers as the signal exits the EDFA. The bandwidth of the amplifier is typically defined as the wavelength range over which there is a 3 dB variation in the gain profile. The improved gain flattened amplifier characteristics provide some improvement in the number of amplifiers, amplifier power ranges, and span lengths before the signal must be regenerated.

While an improvement, the gain profile variations of the various amplifier configurations nonetheless limit the number of amplifiers that can be used in a WDM system prior to signal regeneration. In order to increase the number of amplifiers used in these systems, each amplifier must be more tightly controlled to minimize amplifier variations. A system in which amplifier control complexity increases with the number of amplifiers is clearly undesirable from both a system management and a cost standpoint.

Thus, the present systems do not provide an effective method to overcome the inherent gain variation in EDFAs and provide for continued growth and development of communication systems. Accordingly, there is a need for optical system controllers that allow for increased network capacity and flexibility. One aspect of which is to reduce the limitations placed on the system by amplification components and provide for a more flexible, longer distance transmission system.

BRIEF SUMMARY OF THE INVENTION

The apparatuses and methods of the present invention address the above needs and concerns for improved control over optical systems. An optical transmission system of the present invention includes one or more optical processing nodes, at least one signal varying device and a controller configured to control said at least one signal varying device. The signal varying device is positioned to vary an optical signal which includes at least one wavelength passing to the optical processing nodes. The controller is configured to control the at least one signal varying device based on at least one detected signal characteristic to produce at least one desired signal characteristic at the optical processing node.

In an embodiment, the optical processing nodes include at least one optical signal receiver and at least one optical signal transmitter, and the signal varying devices include a plurality of optical amplifiers. The controller is configured to vary the amplifier properties in response to the signal characteristics, such as signal intensity, noise intensity, signal to noise ratio, etc., to produce an optical signal having desired characteristics at the receiver. The signals are generally detected and characterized as the signals approach or reach the processing nodes. The amplifiers and other signal varying devices can be controlled in concert, in groups, or individually to vary the signal characteristics at the receiver or other processing nodes, such as add and/or drop ports, switches, splitters, combiners, and control points.

In this manner, the signal varying devices, namely amplifiers, attenuators, filters, and associated components, do not have to be as tightly controlled to ensure proper system performance. Instead, the present invention manages the overall variation of the signal varying devices in the system to provide a control system that requires substantially less oversight of each individual signal varying device.

Accordingly, the present invention addresses the aforementioned problems and provides apparatuses and methods to increase the performance and control of optical communication systems. These advantages and others will become apparent from the following detailed description.

BRIEF DESCRIPTION OF THE DRAWINGS

Embodiments of the present invention will now be described, by way of example only, with reference to the accompanying Figures wherein like members bear like reference numerals and wherein.

DETAILED DESCRIPTION OF THE INVENTION

The operation of optical systems 10 of the present invention will be described generally with reference to the drawings for the purpose of illustrating present embodiments only and not for purposes of limiting the same.

Figure 2:
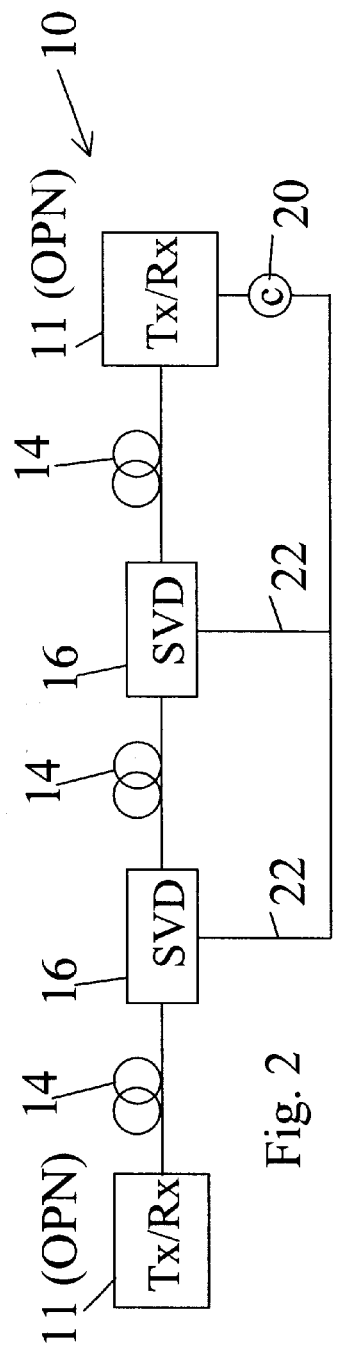
FIGS. 2–3 are optical communication systems of the present invention.
Figure 3:
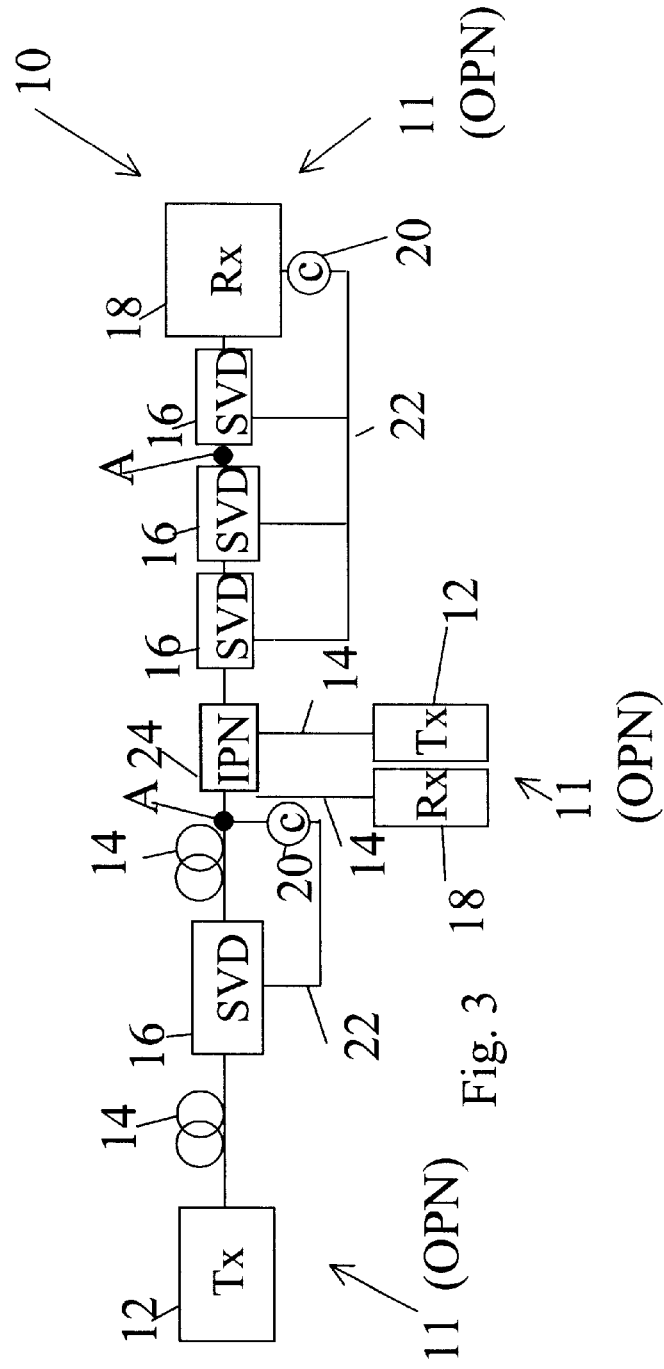

As shown in FIGS. 2 and 3, the optical system 10 includes optical processing nodes 11, such as optical transmitters 12, connected via optical fiber 14 through at least one signal varying device 16 to other optical processing nodes 11, such as optical receivers 18. A controller 20 is configured to detect and monitor any number of characteristics of optical signals passing to the processing nodes. The detected characteristics are used by the controller 20 to provide feedback control over the signal varying devices 16 via control lines 22. The signal varying devices 16 are controlled to vary the characteristics of the optical signals passing through the devices 16 to produce desired characteristics in the optical signal as it reaches the processing nodes 11. The controller 20 is generally configured to control the signal characteristics over an optical link, which includes the optical transmission fiber 14 and at least one signal varying devices 16, extending between the processing nodes 11. The controller 20 can also be used to control the signal characteristics over multiple links, either separately or collectively.

The optical signal passing between the processing nodes 11 includes at least one information carrying wavelength. In WDM systems, the optical signal will generally include a plurality of information carrying wavelengths. As used herein, the term "information" should be broadly construed to include any type of data, instructions, or signals that can be optically transmitted.

Transmitters 12 used in the system 10 generally include one or more modulated carrier wavelength sources or emitters, such as lasers. The transmitters 12 may also include narrow band incoherent sources such as described in U.S. Pat. No. 5,191,586 issued to Huber, or other suitable sources. Receivers 18 used in the system 10 can include direct or indirect, e.g., coherent, detection receivers as are known in the art. One skilled in the art will appreciate that the present invention generally can be used with transmitters 12 and receivers 18 currently used in optical communication systems.

Controllers 20 are used to control the signal varying devices 16 either collectively, in groups, or individually as required in the system 10. The complexity of the controller 20 overseeing the operation of the system 10 will depend, in part, upon the extent of individual control exerted over the individual signal varying devices 16. For example, the control scheme can be simplified by operating the signal varying devices 16 in concert to achieve desired characteristics in the signal arriving at a processing node.

The system 10 can include one or more additional processing nodes 11 in the form an intermediate processing node 24 between the terminal processing nodes, 12 and 18, as shown in FIG. 3. The intermediate processing node 24 can be add and/or drop ports, switches, signal distributors and combiners, control points ("A" in FIG. 3), or other signal processing devices. The intermediate processing nodes may include single wavelength or multiple wavelength processing nodes, such as described in the assignee's copending application filed herewith entitled "Optical Communication System", Docket No. NTI980717OCS U.S. Ser. No. 09/119,562 , which is incorporated herein by reference.

The intermediate node 24 is shown in FIG. 3 connected to a terminal processing node including a receiver 18 and a transmitter 12. The intermediate processing node 24 can also be connected to another intermediate processing node or to a terminal processing node, which may include transmitters and/or receivers. The control points A can be included in the transmission system 10 to provide additional control over the wavelength characteristics in the system 10 and may also correspond to locations at which additional functions such as gain equalization or wavelength filtering can be performed.

In FIG. 3, a plurality of signal varying devices 16 are provided between the intermediate processing node 24 and one of the receivers 18. One skilled in the art will appreciate that any number of signal varying devices 16 can be provided between the processing nodes depending upon the requirements of the system.

Figure 1:
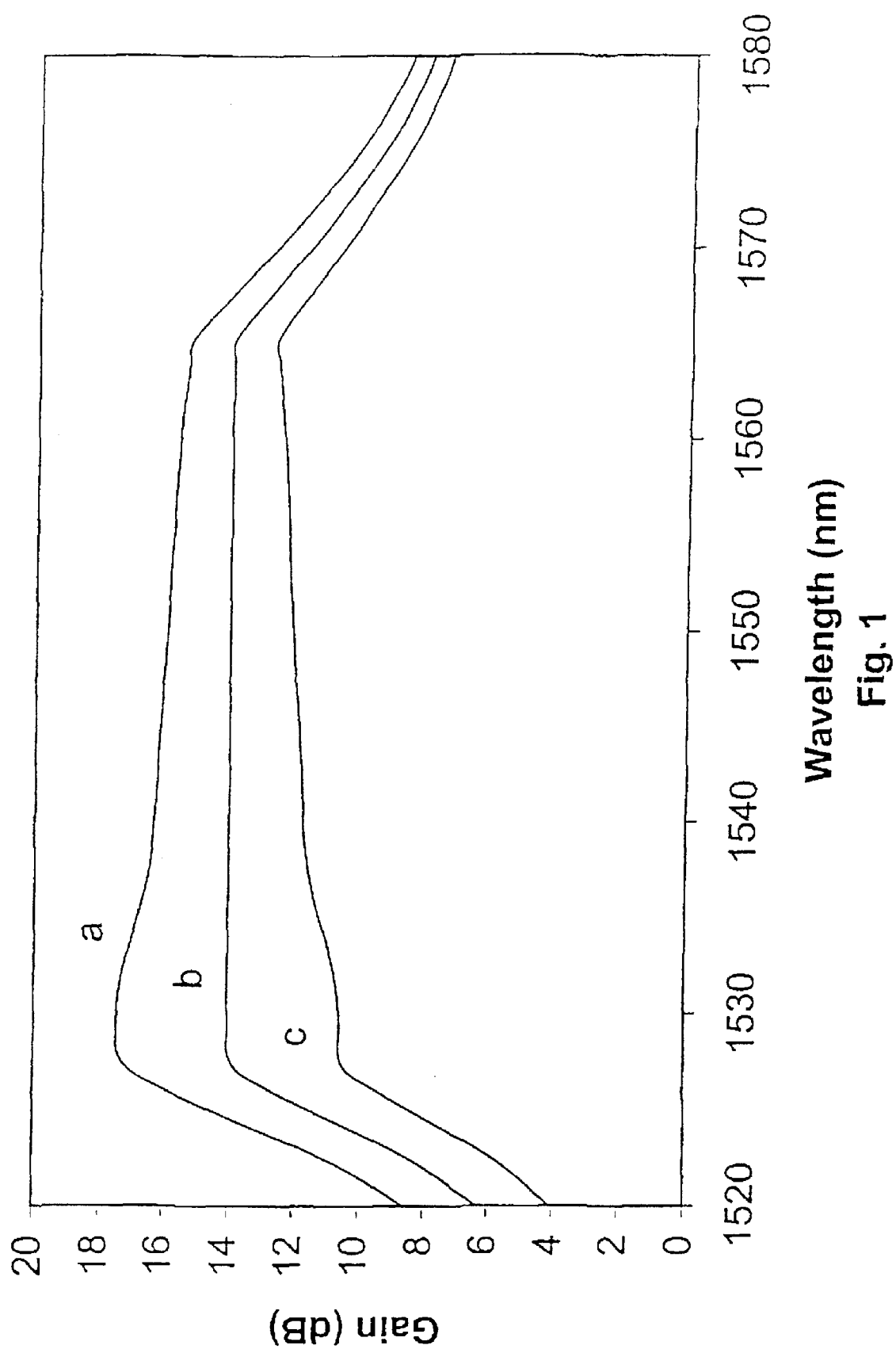
FIG. 1 shows typical gain flattened EDFA characteristics versus wavelength for various amplification powers.
Figure 4A:
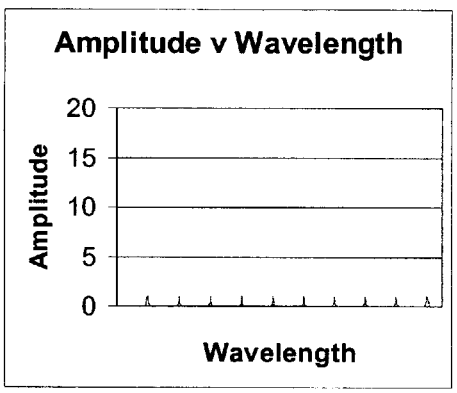
FIGS. 4(a–f) show schematic variations in optical signal intensity as the optical signal passes through the system; and, FIGS. 5–13 are signal varying devices for use in the present invention.
Figure 4B:
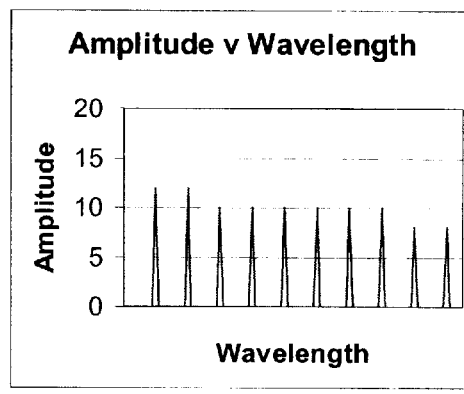
Figure 4C:
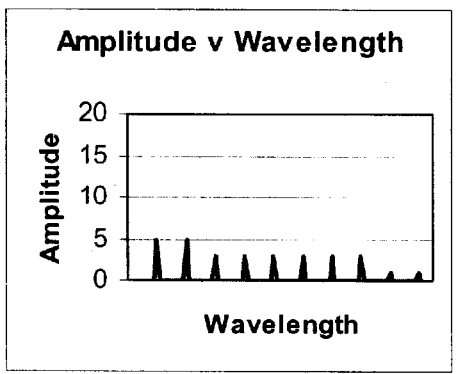

The interaction of the controller 20 with the signal varying devices 16 can be generally described with reference to FIGS. 4(a–e). FIG. 4(a) depicts an optical signal intensity profile versus wavelength for a signal prior to entering a signal varying device 16. A flat intensity profile is shown in FIG. 4(a) to facilitate explanation of the controller 20. If a signal varying device 16 is operated as an amplifier according to gain curve (a) shown in FIG. 1, then the signal of FIG. 4(a) will emerge from the signal varying device 10 having an intensity profile similar to that shown in FIG. 4(b). As the optical signal proceeds though the fiber 14, it incurs fiber losses and may develop an intensity profile similar to FIG. 4(c) as it enters a subsequent signal varying device 16. If a subsequent signal varying device 16 is operated as an amplifier having a gain profile similar to curve (b) in FIG. 1, then the optical signal will emerge from the subsequent signal varying device 16 having an intensity profile similar to FIG. 4(d).

Figure 4D:
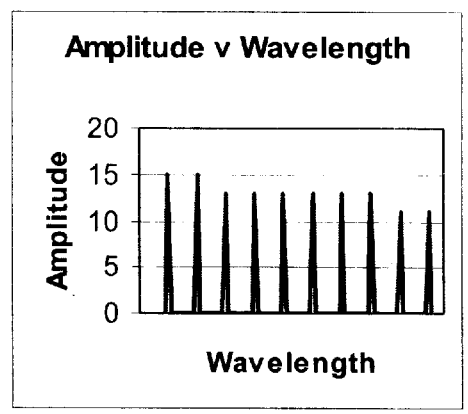
Figure 4E:
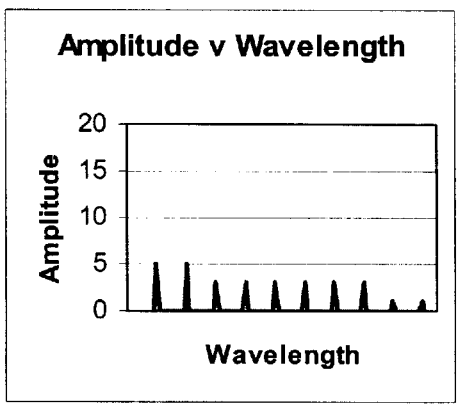

The optical signal of FIG. 4(d) can be further propagated through the fiber 14 and additional signal varying devices 16 incurring further fiber losses and gain profile variations. As the optical signal enters a signal varying device 16 preceding an optical processing node, it may have a profile similar to FIG. 4(e). If the signal varying device 16 preceding the optical processing node is operated having a gain profile similar to curve (c) in FIG. 1, then the optical signal will emerge from the preceding signal varying device and reach the processing node having a substantially uniform gain profile similar to that shown in FIG. 4(f).

Figure 4F:
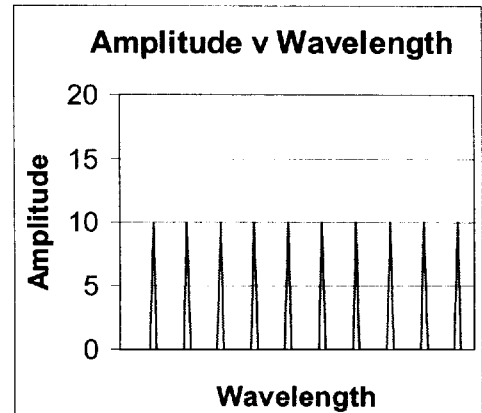

The control of each signal varying device is based on the profile at the optical processing node (FIG. 4(f)) and not based on the profile at each signal varying device along the link as in the prior art. While the example shown in FIGS. 4(a–f) uses the signal intensity and profile as the detected characteristics, other characteristics, such as noise and signal to noise ratio, and statistical measures, such maximum, minimum, averages, and distributions can be used to control the system 10.

In one aspect, the controller 20 is used to detect and monitor the optical signal as it approaches the optical processing node 11. In a second aspect, the controller 20 is used to variably control the performance of the signal varying devices 16 in the link to achieve the desired characteristic at the processing node 11. The control function can be performed by tapping off a portion of the optical signal as it approaches or reaches a processing node and detecting the optical signal characteristics, such as with an optical spectrum analyzer. The detected signal characteristics are compared to either absolute or relative reference characteristics, such as the desired wavelength characteristic profiles. The comparison yields a system variance that is compared to a control variance. If the system variance is within the control variance, the controller 20 does not vary the settings of the signal varying devices 16 in the link. If the system variance is outside the control variance, the controller 20 will vary the settings of the signal varying devices 16 until the system variance is within the control variance. For example, in an embodiment in which the signal varying device includes Raman and erbium amplifiers, the optical energy, i.e., pump power, supplied to the amplifiers can be controlled to vary the output power of the amplifier to achieve the desired characteristics at the optical processing node. In addition, the Raman or erbium fiber sections can also serve as variable attenuators in which the loss of the sections is controlled by varying the pump power supplied to the Raman or erbium fiber sections.

The controller 20 can be used to control the optical signal characteristics by varying the performance of one or more of the signal varying devices 16 individually, in groups, or collectively. The control system complexity, stability, and range of applicability will invariably depend upon the manner in which the signal varying devices 16 are operated.

For example, consider an embodiment in which only one out of N signal varying devices in a link is being controlled by the controller 20. The controller 20 will most likely have to vary the one signal varying device over a wide range to compensate for uncontrolled variations in the N–1 independent signal varying devices. In contrast, if all the signal varying devices in the link are individually controlled, the controller 20 can vary the performance of any combination of signal varying devices to produce a change in the optical signal characteristics. However, the number of possible control combinations may require more complex control schemes and could lead to system instability and slower response times.

In contrast, when all of the signal varying devices 16 in the link are controlled in concert by the controller 20, the link can be controlled with a less complex control scheme. This is because the possible control combinations have been decreased and variations in the system can be averaged over all of the signal varying devices 16 in the link. Also, the link stability is improved because the signal varying device performance is varied continuously along the link. As such, the probability that any given signal varying device will have to be grossly adjusted will be reduced, thereby improving the response time of the link.

Individual control over the signal varying devices can be useful for facilitating initialization during manufacturing and installation, and resetting and fine tuning of the signal varying devices 16 during operation. The signal varying devices 16 can also be controlled in groups, to provide additional control over different types of signal varying devices 16 deployed in the system 10.

FIGS. 5–13 show several embodiments of signal varying devices 16 containing various components that can be connected to the controller 20 via control line 22 in the present invention. The embodiments shown in FIGS. 5–13 are provided to facilitate the explanation of the control scheme, and not to limit, the present invention.

The signal varying devices 16 will often include an amplifier 26 in one or more stages. The amplifier 26 can include concentrated, or lumped, and distributed EDFAs, Raman amplifiers, other optical amplifiers, and combinations thereof that provide fixed or variable gain. Optical power can be supplied to the optical amplifiers 26 by either locally or remotely pumping the amplifiers 26 to supply optical energy. In addition, the signal varying devices 16 can incorporate various gain flattening configurations such as those discussed in the background section. While the present invention does not require that each signal varying device 16 operate with a uniform gain profile, amplifier configurations that provide improved gain profile flatness will tend to increase the stability, flexibility, and overall performance of the system 10.

The signal varying device 16 can also include other signal varying components, such as attenuators 28, and filters 30. The filters 30 can be Mach-Zehnder, Fabry-Perot or dichroic filters, fixed or tunable Bragg gratings, or other filters as may be required in system 10. The filters 30 may be used in combination with directional couplers and/or circulators to vary the signal, such as described in U.S. Pat. Nos. 5,007, 705, 5,283,686 and 5,579,143. Signal varying devices that are useful in the present invention are described in the assignee's copending application filed herewith entitled "Optical Signal Varying Device", Docket No. NTI980717OSVD, U.S. Ser. No. 09/119,556 which is incorporated herein by reference.

In FIGS. 5-9, a variable attenuator 28 is provided in the signal varying device 16 and connected via the control line 22 to the controller 20. In the FIG. 5 configuration, the variable attenuator 28 is used to vary the optical signal intensity after the optical signal passes through the amplifier 26 and filter 30. The optical signal emerging from the variable attenuator 28 has a signal intensity profile versus wavelength that was produced by the preceding amplifier 26, but the wavelength intensities are reduced via the attenuator 28 to a level set by the controller 20.

Figure 5:
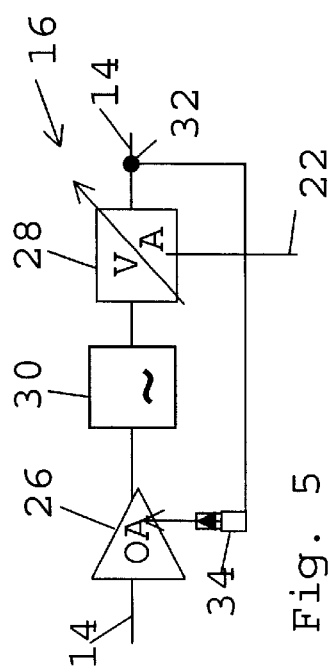

Also in the FIG. 5 configuration, an amplifier controller 32 provides feedback control over the output power of the signal varying device 16, typically by varying the pump power supplied to the devices 16 by an amplifier pump 34. In operation, the amplifier controller 32 is used in conjunction with the controller 20 to vary the optical power supplied to the amplifier 26 as part of the overall control of the signal varying device 16.

Figure 6:
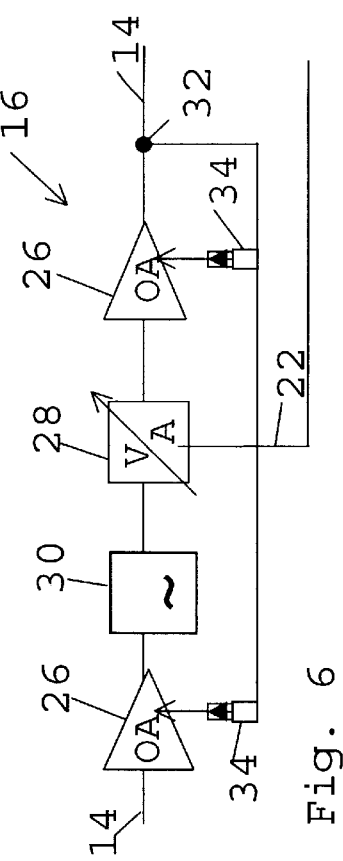

In the FIG. 6 configuration, the amplifier controller 32 can also be set, either by the controller 20 or otherwise, to deliver the optical signal at a predetermined intensity as it exits the signal varying device 16 into the fiber 14. The amplifier controller 32 set point is generally determined by the power necessary to overcome the loss in the fiber 14 and to provide a signal having a predetermined power at the next signal varying device 16 or processing node 11.

In the embodiment shown in FIG. 6, an additional amplifier configuration 26 is provided between the attenuator 28 and the amplifier controller 32 to provide additional flexibility in controlling the optical signal characteristics. As previously stated, the amplifiers 26 shown in the drawings can be single or multiple stage EDFAs, Raman amplifiers, and/or other gain flattening amplifier configurations, such as discussed in the background. In an embodiment, the signal varying device includes distributed and concentrated Raman sections followed by an Erbium doped fiber section and a gain flattening filter. The controller 20 can be used to vary the pump power supplied to the Raman and erbium sections to operate the fiber sections as variable attenuators or amplifiers as necessary to achieve the desired signal characteristics.

Figure 7:
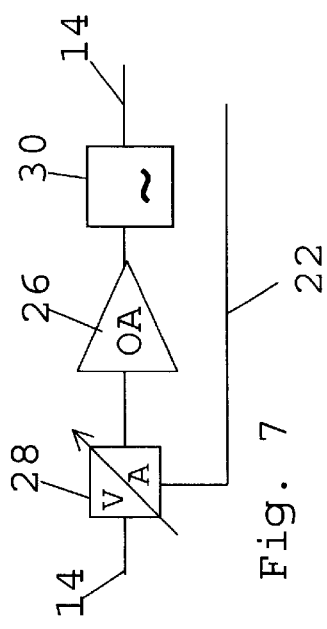

The signal varying device in FIG. 7 provides for controlling the intensity of the signal using the attenuator 28 preceding the amplifier 26. In this configuration the amplifier may be preset to deliver a prescribed level of amplification to the signal. The attenuator 28 is operated to control the input power to the amplifier 26 so that the signal will exit the amplifier 26 and pass through the filter into the fiber at a predetermined intensity.

Figure 8:
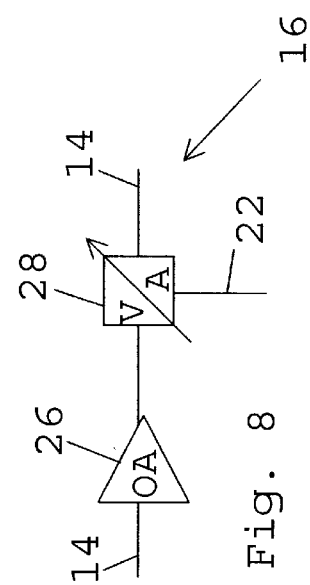

Similarly in FIG. 8, the amplifier 26 can be operated at a predetermined amplification power. The attenuator 28 is then operated to deliver the optical signal into the fiber 14 at a predetermined intensity.

Figure 10:
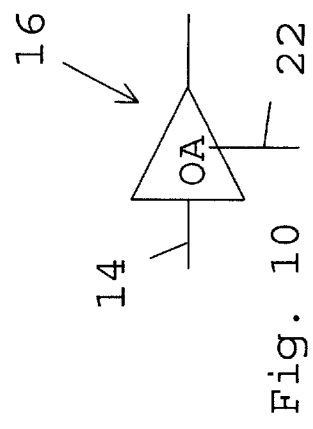
Figure 11:
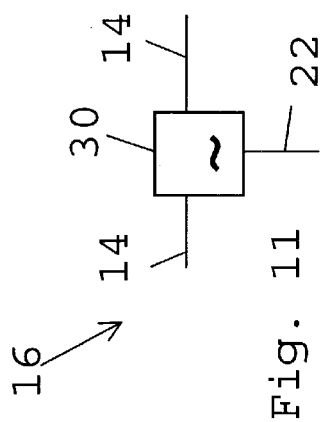
Figure 9:
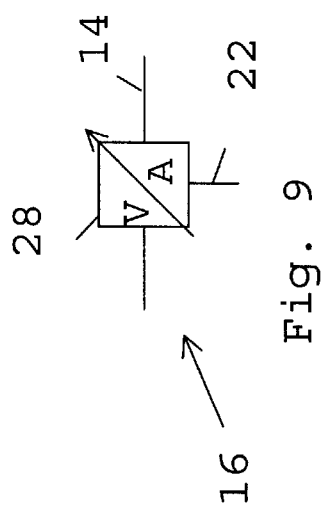
Figure 12:
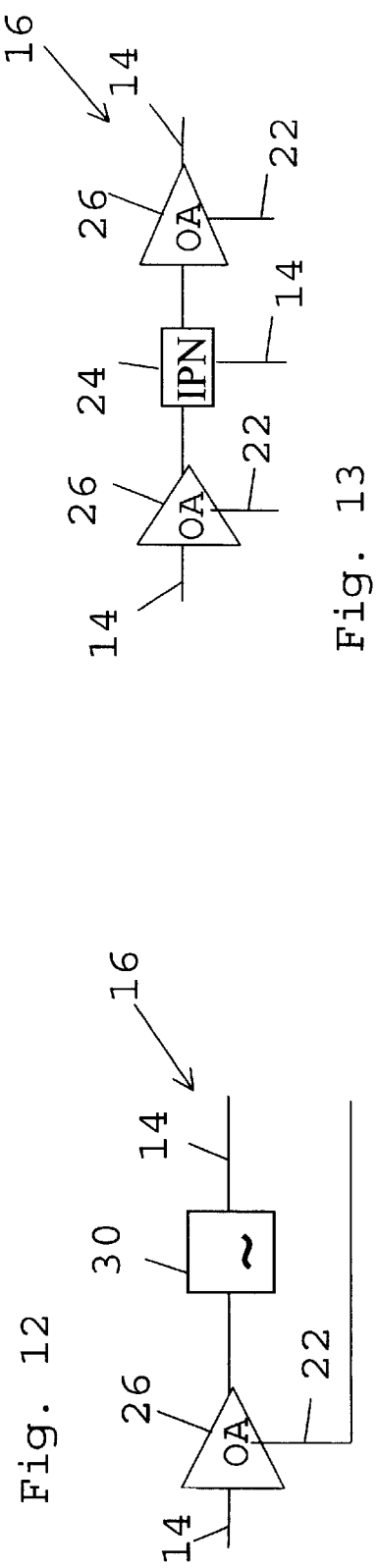

As shown in FIGS. 9-11, the signal varying device 16 can be embodied solely as attenuators, amplifiers, and filters, respectively. Each of the devices being controlled by the controller 20 to vary the optical signal characteristics. In FIG. 12, an amplifier 26 is operated in combination with the filter 30 to vary the characteristics of the optical signal being delivered into the fiber 14.

Figure 13:
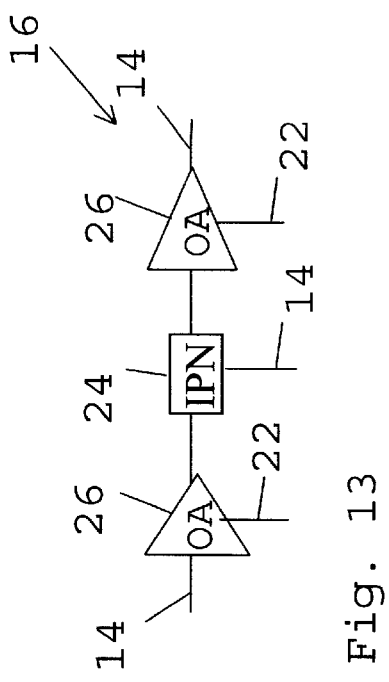

In some instances, it may be desirable to couple the intermediate processing node 24 with the signal varying device 16 as shown in FIG. 13. This configuration provides for monitoring and control the signal characteristics immediately before and after the signal has been processed in the intermediate processing node 24.

In the operation of the system 10, the controller 20 provides for dynamic control over the signal varying devices to compensate for variations in the system 10. Typical system variations include the number of wavelengths/channels being used in the system, signal processing occurring at the processing nodes, environmental conditions, and replacement or degradation of system components.

In the present invention, signal varying devices 16 can be roughly calibrated prior to insertion into the system 10. After insertion into the system 10, the signal varying devices 16 can be dynamically adjusted to provide the amplification power and signal profile characteristics required in the system 10.

Unlike prior art systems, the present invention can provide for increased stability as the length of the system 10 is increased. The increased stability is possible because the system performance can be averaged over a larger number of signal varying devices between optical processing nodes. Thus, the addition of signal varying devices 16 to the system 10, while adding loss to the system 10, can actually provide additional system stability.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical transmission system comprising:
   at least one optical processing node;
   at least one signal varying device including a concentrated amplifier remotely positioned from said at least one optical processing node to vary an optical signal passing to said at least one optical processing node; and,
   a controller configured to control said at least one concentrated amplifier to achieve a desired signal characteristic in the optical signal when the optical signal reaches said at least one optical processing node.

2. The optical transmission system of claim 1 wherein said controller controls said at least one signal varying device in response to at least one detected characteristic of the optical signal proximate to said at least one optical processing node.

3. The optical transmission system of claim 1 wherein said at least one optical processing node includes at least one transmitter configured to optically transmit said optical signal to at least one receiver and said at least one signal varying device is controlled to achieve said desired signal characteristics in the optical signal when the optical signal reaches said at least one optical processing node.

4. The optical transmission system of claim 1 wherein said at least one optical processing node includes at lease one of transmitters, receivers, add ports, drop ports, add/drop ports, switches, control points, and combinations thereof.

5. The optical transmission system of claim 1 wherein said at least one signal varying device further includes signal varying devices selected from the group consisting of locally and remotely pumped, concentrated and distributed amplifiers, attenuators, filters, and combinations thereof.

6. The optical transmission system of claim 1 wherein said at least one signal varying device includes a distributed Raman fiber section in series with said concentrated optical amplifier which includes a concentrated Raman fiber section, an erbium doped fiber section and a gain flattening filter, wherein each of said fiber sections is provided with optical pump energy from at least one pump source and said controller is configured to vary said pump energy supplied to each of said fiber sections to operate said sections as an attenuator, an amplifier, a lossless fiber section, and combinations thereof.

7. The optical transmission system of claim 6 wherein said distributed Raman fiber section and said erbium fiber section are operated as amplifiers by said controller, and said controller is configured to operate said concentrated Raman fiber section as an attenuator, an amplifier, a lossless fiber section, and combinations thereof.

8. The optical transmission system of claim 1 wherein:
said optical signal includes a plurality of information carrying wavelengths that can be characterized by detecting characteristics including signal intensity, noise intensity, and signal to noise ratio;
said at least one signal varying device is controlled to vary said detected characteristics of said plurality of wavelengths to achieve said desired characteristic in said plurality of wavelengths when said plurality of wavelengths reach said at least one optical processing node.

9. The optical transmission system of claim 8 wherein said detected characteristics include maximum, minimum, and average values and distribution profiles.

10. The optical transmission system of claim 1 wherein said controller provides for collectively controlling each of said at least one signal varying devices.

11. The optical transmission system of claim 1 wherein said controller provides for individually controlling at least one of said at least one signal varying devices.

12. The optical transmission system of claim 1 wherein said desired characteristic includes minimizing gain flatness variations between signal wavelengths in said optical signal having wavelength signal intensities that are detectable by an optical receiver included in said at least one optical processing node.

13. The optical transmission system of claim 1 wherein said at least one signal varying device includes second optical amplifiers selected from the group consisting of erbium doped fiber amplifiers, distributed Raman amplifiers, concentrated Raman amplifiers, and combinations thereof.

14. The optical transmission system of claim 1 wherein said at least one signal varying device includes:
a first and a second optical amplifier having controllable output powers;
an optical filter positioned between said first and said second amplifiers;
a variable attenuator further controlled by said controller to variably attenuate the optical signal to achieve said desired signal characteristic at said at least one optical processing node; and,
an amplifier controller configured to locally control the output power of said first and said second amplifiers.

15. The optical transmission system of claim 14 wherein said variable attenuator is positioned between said amplifier controller and said second amplifier.

16. The optical transmission system of claim 14 wherein said amplifier controller is positioned between said variable attenuator and said second amplifier.

17. The optical transmission system of claim 1 wherein said at least one optical processing node includes at least one control point configured to provide gain equalization and wavelength filtering.

18. The optical transmission system of claim 1 wherein said at least one signal varying device includes:
an optical amplifier having a locally controllable output power;
a variable attenuator further controlled by said controller to variably attenuate the optical signal to achieve said desired signal characteristic at said at least one optical processing node; and,
an amplifier controller configured to locally control said amplifier to produce a desired output power from said amplifier.

19. The optical transmission system of claim 1 wherein, said optical signal achieves said desired signal characteristic after passing through said at least one signal varying device immediately preceding said at least one processing node.

20. The optical transmission system of claim 1 wherein said at least one signal varying device includes:
an optical amplifier;
a variable attenuator further controlled by said controller to variably attenuate the optical signal to achieve said desired signal characteristic.

21. The optical transmission system of claim 1 wherein:
said at least one signal varying device is one of a plurality of signal varying devices including a corresponding plurality of concentrated amplifiers remotely positioned to vary an optical signal passing to said at least one optical processing node; and,
said controller being configured to collectively control said plurality of concentrated amplifiers to achieve said desired signal characteristic when said optical signal reaches said at least one optical processing node.

22. The optical transmission system of claim 21 wherein said optical signal includes a plurality of wavelengths and each of said plurality of amplifiers is controlled to substantially minimize the gain variation in said plurality of wavelengths at said at least one optical processing node.

23. The optical transmission system of claim 1 wherein said at least one signal characteristics are detected at a control point remote from said plurality of processing nodes and said at least one signal varying device is controlled to produce an optical signal having said desired signal characteristics at said control point.

24. An optical transmission system comprising:
an optical transmitter for transmitting optical signals;
an optical receiver optically communicating with said transmitter;
a plurality of signal varying devices each including a concentrated optical amplifier positioned to vary an optical signal passing from said transmitter to said receiver; and,
at least one controller configured to control said plurality of concentrated optical amplifiers in response to at least one detected characteristic of the optical signal to vary the optical signal to have the at least one desired signal characteristic when the optical signal reaches said receiver.

25. The optical transmission system of claim 24 including at least one intermediate processing node selected from the group consisting of add ports, drop ports, switches, distributors, combiners, control points, and combinations thereof in optical communication with said transmitter and said receiver; and, said at least one controller is further configured to control said plurality of signal varying devices to achieve said at least one desired signal characteristic at said at least one intermediate processing node.

26. A method of controlling an optical transmission system comprising:

positioning at least one signal varying device including a concentrated optical amplifier remote from an optical processing node to vary an optical signal passing to the optical processing node; and, controlling the at least one concentrated optical amplifier to vary the optical signal to have at least one desired signal characteristic when the optical signal reaches the optical processing node.

27. The method of claim 26, further comprising:

detecting characteristics of the optical signal; and, comparing detected characteristics of the optical signal to the at least one desired characteristic, and wherein said controlling includes controlling the at least one signal varying device to vary the optical signal until the detected characteristics correspond to the desired characteristics when the optical signal arrives at the processing nodes.

28. The method of claim 27, wherein said controlling includes selecting the at least one desired signal characteristic from the group consisting of signal-to-noise ratio, signal intensity, noise intensity, and combinations thereof.

* * * * *